United States Patent
Lintz

[15] 3,673,729
[45] July 4, 1972

[54] FISHING FLOAT

[72] Inventor: Ervin E. Lintz, 1412 Martha N.E., Albuquerque, N. Mex.

[22] Filed: July 7, 1970

[21] Appl. No.: 52,886

[52] U.S. Cl. ....................................................43/43.11
[51] Int. Cl. ...............................................A01k 93/00
[58] Field of Search................................................43/43.11

[56] References Cited

UNITED STATES PATENTS

| | | | |
|---|---|---|---|
| 3,340,644 | 9/1967 | Lintz | 43/43.11 |
| 1,973,028 | 9/1934 | Thomas | 43/43.11 |

Primary Examiner—Samuel Koren
Assistant Examiner—Daniel J. Leach
Attorney—Stevens, Davis, Miller & Mosher

[57] ABSTRACT

An improved fishing float, which includes means for automatically controlling and regulating the amount of drop-line to be used, comprising a pair of mating housings each having a freely rotatable spool therein and means to secure the housings together. The securing means comprises a groove and detent arrangement cooperating with resilient tongues and serves to cam the float open and closed upon application of a relative twisting motion to the housings. The spools are coupled together and a cast-line is wound onto one of the spools and extends to a fishing reel. A drop-line is wound on the other spool in the opposite direction from that of the cast-line so that as line is wound off one spool the other line is wound onto the other spool.

5 Claims, 6 Drawing Figures

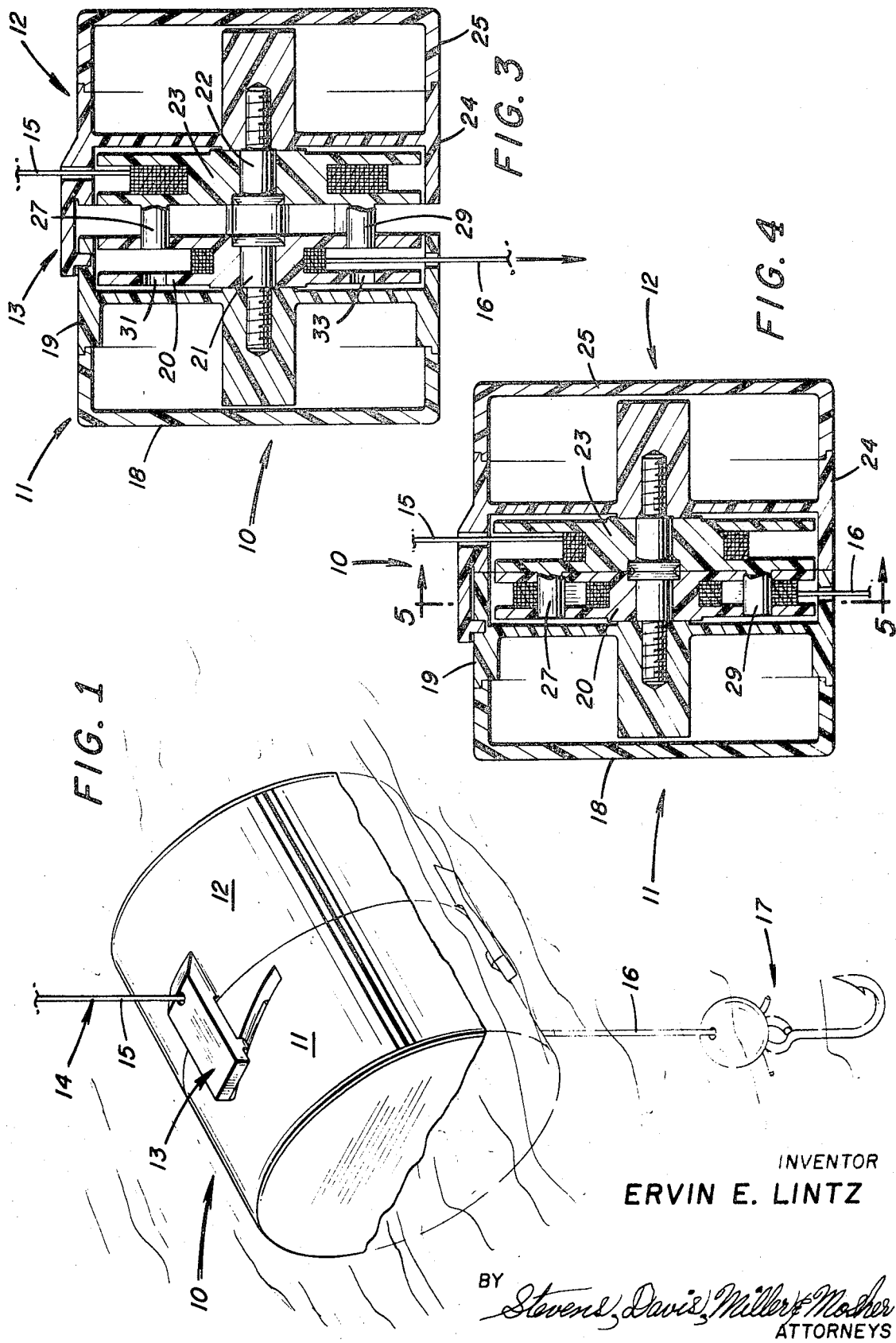

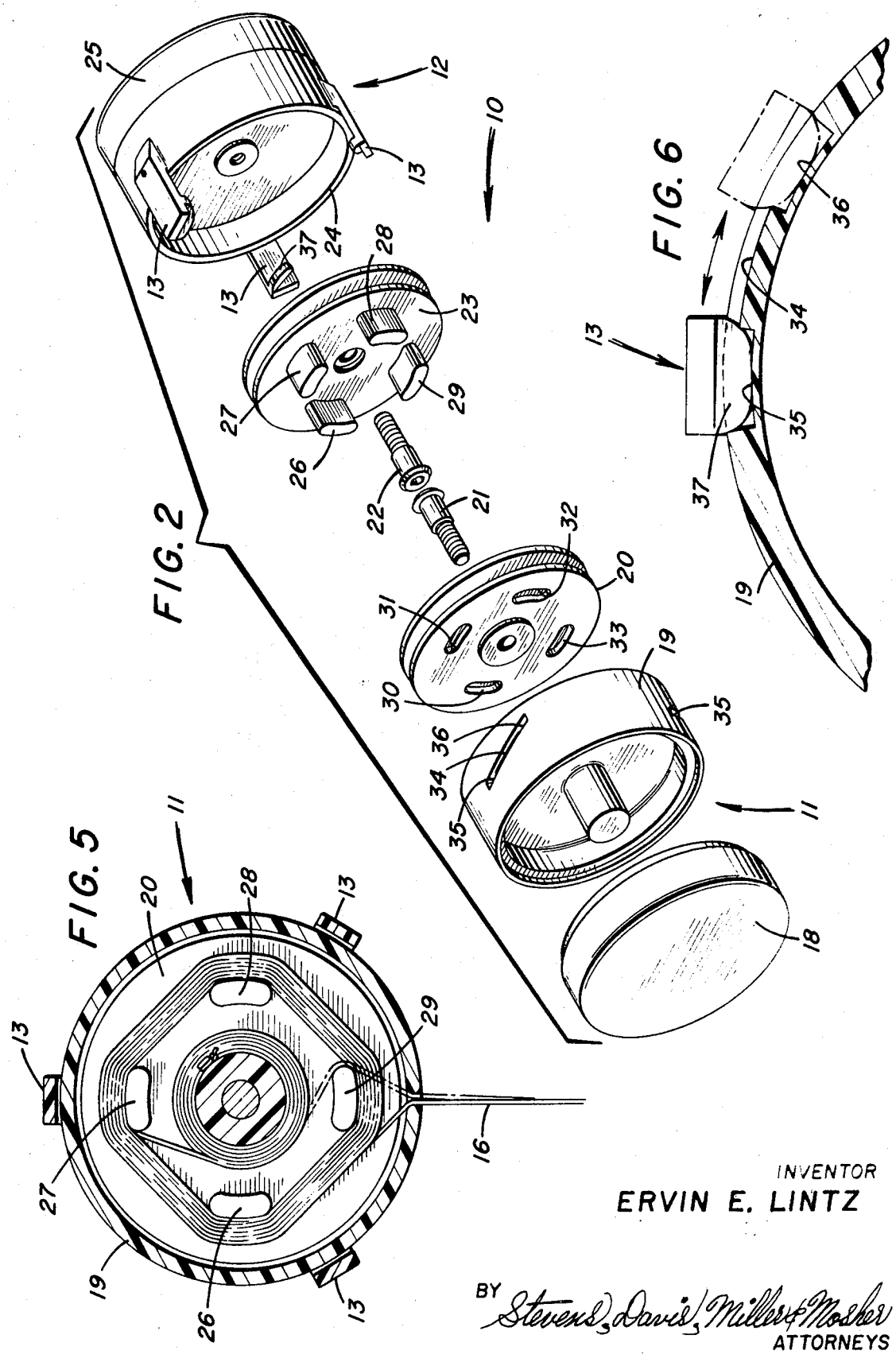

FISHING FLOAT

The present invention relates to a fishing float and constitutes an improvement over the float described in my U.S. Pat. No. 3,340,644, issued Sept. 12, 1967.

It is well known in the fishing art to have a float in which a buoyant member is provided with two spools rotatably mounted on a common shaft. A cast-line is wound on one of the spools and extends to the fishing reel on the fishing pole and a drop-line is wound on the other spool in the opposite direction from that of the cast-line and is connected to a fish lure, weight, or hook, etc. Due to the fact that the respective lines are wound in opposite directions and that the spools are coupled together, this type of float provides for automatic control of the depth to which the drop-line extends into the water.

In general, the operation of these known devices is as follows: an amount of drop-line corresponding to the desired fishing depth is initially wound on the drop-line spool and at least a corresponding amount is wound in the opposite direction from the fishing reel onto the cast-line spool. When the float is cast onto the water, the drop-line spool is rotated, usually due to the weight of the fish lure, and all of the drop-line winds off, thereby locating the fishing lure at the desired depth. At the same time, the cast-line spool, which is coupled to the drop-line spool, is also rotated and a like amount of cast-line from the fishing reel is wound up on the cast-line spool. When the fisherman is through fishing, he winds the fishing line upon his fishing reel which in turn causes the two spools in the float to rotate so that the cast-line is wound off the cast-line spool and onto the fishing reel and the drop-line is wound onto the drop-line spool.

It is also well known to have only a single line effecting all of the above operations. A single line usually passes from one spool to the other through a notch or the like. However, the same operating principles as described above apply to both cases.

The primary disadvantage of the prior art devices, with the exception of my above-mentioned patent, is that there is no way for the fisherman to change the depth to which the drop-line extends, this depth being exclusively determined by the amount of drop-line initially wound on the drop-line spool. Some of the more sophisticated prior art devices have attempted to solve this bothersome problem by utilizing notches, pins or the like in conjunction with the drop-line spool to allow for adjustment of the amount of drop-line. In general use of these devices, a relatively large amount of drop-line is initially wound on the drop-line spool and the exact amount of line for the desired depth is then wound over the pin and hub or in the notch, etc. When the float is cast, only the latter amount of drop-line pays out from the spool. However, this known float is bulky in size, complicated to operate, and difficult to manufacture, thus making them rather expensive. Also, the fisherman must almost completely disassemble the float in order to regulate the amount of drop-line to be used, which requires a great deal of time and patience.

The present inventor has evolved and produced a fishing float which permits the automatic control of the amount of drop-line used and which overcomes the above-mentioned difficulties by providing means to easily and quickly regulate the amount of drop-line.

Briefly summarized, the present invention comprises a fishing float in which at least two spools are rotatably mounted on separate shafts carried by the float. The float consists of two similar sections each containing one of the spools and means to hold the sections together. The fishing line, which consists of two separate lines, is wound on the spools in opposite directions and one portion thereof extends to the fishing reel and the other portion carries the fish lure, hook, weight, or the like. One or more pins are provided on one spool and a like number of orifices are provided in the other spool so that when the spools are moved into abutting relationship, after the desired amount of drop-line has been paid out, the pins extend across and parallel to the hub of the other spool to receive thereon the drop-line upon the subsequent winding in thereof. For each succeeding cast, this amount of line is wound off the pins to position the fish lure, hook, weight, etc. in the water at the desired depth.

One of the float sections in the present invention is provided with a plurality of externally directed recesses and the other float section is provided with a like plurality of lugs which engage with the recesses, allowing a relative twisting motion between the sections which also serves as a cam to open and close the float. When the fisherman desires to change the amount of drop-line to be used, he merely has to exert a small amount of pressure in rotating the two sections to an open position with the sections spaced apart, unwind the desired amount of line from the hub of the proper spool, and rotate the sections back together again.

Thus the present invention permits the automatic control of the amount of drop-line to be used as well as permits the regulation of this amount in an extremely simple and quick manner.

The means for accomplishing the foregoing objects and other advantages, which will be apparent to those skilled in the art, are set forth in the following specification and claims and are illustrated in the accompanying drawings dealing with a basic embodiment of the present invention.

FIG. 1 is a perspective view of the float in the water;

FIG. 2 is an exploded perspective view of the present fishing float;

FIG. 3 is a longitudinal section through the float in the opened position;

FIG. 4 is a similar section with the float in the closed position;

FIG. 5 is a view taken along line 5—5 of FIG. 4; and

FIG. 6 is an enlarged longitudinal section along one of the tongue slots and showing one of the associated locking detents.

Rather than going into a detailed description of each structural feature of the present invention, the inventor wishes to rely upon the description of the basic principle of operation and structure shown in his above-mentioned U.S. Pat. No. 3,340,644 and to here enumerate the novel differences between the devices. In the present invention, a system of external grooves and detents has been employed to replace the previous shaft and detent system described in said patent. Hence, the external configuration is changed from a sphere to a cylinder or an elongated sphere if the end bells are made hemispherical. The entire assembly of shaft 13, snap cap 35, elliptical snap ring 36 and the annular notch 38 of my patented float have been eliminated in the present fishing float. In place of the old shaft 13, two fixed shoulder screws are now used which allow the spools to rotate thereon but prevent lateral movement relative to the respective sections. The pins 40 of the previous fishing float have been changed in shape and are now contoured and generally referred to as lugs integral with the cast-line spool. Their function remains substantially the same as the pins 40 of said patent. The two buoyant sections 11 and 12 of the original float have now been more broadly described as flotation chambers to include air-filled chambers as well as chambers filled with or formed from a buoyant material.

Referring now to the present float as shown in FIG. 1, the float 10 comprises two sections 11 and 12 which are secured together by a plurality of securing means 13. Preferably, there are three of these securing means spaced 120° apart around the periphery of the float. A fishing line 14 passes through the float and forms the cast-line portion 15 and drop-line portion 16 which has the fish lure, hook, etc. 17 fastened on the end thereof.

FIG. 2 shows the float in an exploded perspective view. Both buoyant sections are preferably formed in two parts; however, only section 11 is shown disassembled in this figure. Going from left to right, the float comprises the section 11 having an end bell 18 and drop-line spool housing 19, bait drop-line spool 20, flat head shoulder screws 21 and 22, casting line spool 23, and section 12 having a casting-line spool housing 24, and end bell 25. Each of the spools 20 and 23 is freely rotatably mounted on the respective flat head shoulder screws 21 and 22 which are threaded into their respective housings 19 and 24. The fishing line 14 has line 15 wound around the cast-line spool 23 and line 16 wound on the drop-line spool 20 and extending to the fish lure, hook, weight, etc. 17, connected to the end of the drop-line. The fishing line 15 is ultimately connected to a fishing reel or the like on a fishing pole, neither of which have been shown. Arcuate lugs 26 to 29 are integrally formed on the cast-line spool 23 and pass through arcuate orifices 30 to 33 in the drop-line spool 20 and served to couple the spools together.

FIGS. 3 and 4, respectively, show the open and closed positions of the present float in section. In FIG. 3, the sections 11 and 12 have been rotated in opposite directions which causes the securing means 13 to cam the float open in order to adjust the line in the manner described below. After the line is adjusted, the sections are again twisted relative to each other to cam the float closed, as shown in FIG. 4.

FIG. 5 shows, in a sectional view, how the line is wound about the drop-line spool and the lugs of the cast-line spool.

Turning now to FIG. 6 which shows the new securing means, as previously stated, there are preferably three sets of these means spaced 120° apart around the exterior of the float and each one operates in the same manner.

The groove portion 34 of the securing means has detent portions 35 and 36 formed at each end thereof and which represent the limit of travel for the associated tongue 37. In the closed float position, the tongue 37, which is made of a resilient material, will snap into the closed detent 35 and in the opened float position it will snap into the open detent 36. The groove 34 has a definite length and is positioned at an angle with respect to the rotational axis of the float so that the movement of the tongue in the groove from the closed detent to the opened detent represents approximately thirty degrees of the float circumference and a lateral travel approximately equal to the sum of one wall thickness plus winding width of the drop-line spool. The tongue 37, as best seen in FIG. 2, is canted approximately 20° to match and mate with the groove. The tongue is rounded off at the corners to facilitate movement out of the detents when the proper amount of torque is applied through the individual sections of the float. The tongue, as stated previously, is made of a resilient material so that the tongue is always biased into the groove and will travel therewith having a snap action when it is moved into a detent.

In order to change the depth setting of the line with the present device, the operations are as follows.

First, the float is held up to allow all drop-line from the previous depth setting to be reeled out. Failure to observe this simple precaution may result in tangling of the drop-line in the spool depending upon how much line is involved in the previous setting. Second, the float is grasped with both hands just as if one were able to unscrew a nut and bolt, making sure to capture the cast-line by the thumb and sustain it in this position. Third, the two sections are twisted apart as if removing a nut from a bolt. The two halves of the float will move apart as the tongues slide along the respective grooves and snap into the float open position. Fourth, the cast-line should be taken between the thumb and forefinger and adjusted to the new depth setting. Pulling on the cast-line to unwind it from its spool gives a shallower depth setting by causing the drop-line to be simultaneously wound upon its spool, while allowing the lure weight to pull more drop-line from its spool causes simultaneous winding of cast-line onto its spool, thereby giving a deeper setting. Fifth, again holding the cast-line under the thumb and twisting the two float sections together brings the float to the closed position.

At this point, the spools are in their operative position with lugs 26-29 extending across and parallel to the hub of spool 20, as shown in FIG. 4. When a fish is caught or it is desired to recast, the fisherman merely reels in the cast-line off of spool 23, causing a rotation of it and of spool 20, which, in turn, causes drop-line 16 to be wound around lugs 26-29 instead of the hub of spool 20. This is continued until the float is at a point adjacent to the rod tip, with the weight, hook or the like immediately adjacent to the float. The arrangement of drop-line 16 at this point is shown in FIG. 5, the portion corresponding to the previous fishing depth being around lugs 26-29, and the remaining portion around spool 20. When another cast is made and the float hits the water, the weight, hook, lure or the like sinks toward the bottom of the body of water due to its own weight, causing the spool 20 to rotate, which allows the drop-line 16 to be wound off of lugs 26-29. In the meantime, cast-line 15 is being wound from the fishing reel onto spool 23. As soon as the predetermined amount of drop-line 16 has been wound off of lugs 26-29, one of the lugs will co-act with line 16 to cause the rotation to cease. The weight, hook or lure will then be at the pre-determined fishing depth. The casting may be repeated indefinitely with the assurance that this depth will be obtained with every cast.

It is thus seen that the device of the present invention has many advantages, some of which are noted below:

1. The spool arrangement may be inserted entirely within the buoyant member and out of contact with water;

2. The device is relatively simple and may be easily and economically manufactured;

3. The amount of drop-line may be regulated very easily simply by twisting the two sections apart, unwinding the desired amount of line from the hub of the spool and twisting the two sections together again.

The present invention may be embodied in other specific forms without departing from the spirit or essential characteristics thereof. The present embodiment is therefore to be considered in all respects as illustrative and not restrictive, the scope of the invention being indicated by the appended claims rather than the foregoing description, and all changes which come within the meaning and range of equivalency of the claims are therefore to be embraced therein.

I claim:

1. A fishing float to be used with fishing lines to automatically control the depth in the water to which the bait extends, said float comprising two buoyant sections, means to secure said sections together while allowing relative rotational and spacing apart movement, one of said buoyant sections comprising a first housing, a first shoulder screw mounted in said first housing, a cast-line spool freely rotatably mounted on said first screw, and a first end bell, the other of said buoyant sections comprising a second housing, a second shoulder screw mounted in said second housing, a drop-line spool freely rotatably mounted on said second screw, and a second end bell, said first and said second end bells defining respective first and second floatation chambers.

2. The float of claim 1 further comprising contoured lugs mounted on said cast-line spool and recesses formed in said drop-line spool, said lugs engaging in respective recesses when the float is closed to lock said spools together for rotation.

3. The float of claim 2 wherein said lugs extend across and parallel to the hub of the drop-line spool, upon closure of the float to the operative position said lugs forming a new radius for the drop-line spool onto which the length of drop-line corresponding to the selected depth is wound.

4. The float of claim 1 wherein said means to secure said sections comprises groove means formed in one of said sections and resilient tongue means formed on the other of said sections and engaging in said groove means.

5. The float of claim 4 wherein said groove means comprises a groove having detents formed at each end thereof, said groove being at an angle with respect to the abutting sides of said sections whereby engagement of the tongue means in said groove means will positively secure the float sections at each respective end of the groove means and while traveling the length of the groove means will serve to cam the float open and closed.

* * * * *